(12) United States Patent
Patel et al.

(10) Patent No.: US 6,372,782 B1
(45) Date of Patent: Apr. 16, 2002

(54) SOY-BASED NUTRITIONAL PRODUCTS

(75) Inventors: Guaravkumar C. Patel, Gahanna; Michael Allen Chandler; Kent Lee Cipollo, both of Westerville; Lisa Diane Craig, Columbus; Theresa W. Lee, Upper Arlington, all of OH (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 09/337,217

(22) Filed: Jun. 18, 1999

Related U.S. Application Data

(63) Continuation-in-part of application No. 09/107,886, filed on Jun. 30, 1998.

(51) Int. Cl.[7] .......................... A61K 31/35; A61K 9/68; A23L 2/38; A23J 1/100; A23J 1/36
(52) U.S. Cl. .......................... 514/456; 426/598; 426/72; 426/74; 426/656; 426/629; 424/440
(58) Field of Search .......................... 514/456; 426/598, 426/72, 74, 656, 629; 424/440

(56) References Cited

U.S. PATENT DOCUMENTS

| | | | |
|---|---|---|---|
| 4,642,238 A | 2/1987 | Lin et al. | 426/74 |
| 5,186,963 A | 2/1993 | Howman | 426/72 |
| 5,320,949 A | 6/1994 | Shen | 435/68.1 |
| 5,352,384 A | 10/1994 | Shen | 252/398 |
| 5,403,826 A | 4/1995 | Cope et al. | 514/21 |
| 5,413,803 A | 5/1995 | Chung | 426/598 |
| 5,424,331 A | 6/1995 | Shlyankevich | 514/456 |
| 5,514,655 A | 5/1996 | DeWille et al. | 514/21 |
| 5,547,927 A | 8/1996 | Cope et al. | 514/2 |
| 5,569,459 A | 10/1996 | Shlyankevich | 424/195.1 |
| 5,637,561 A | 6/1997 | Shen et al. | 514/2 |
| 5,637,562 A | 6/1997 | Shen et al. | 514/2 |
| 5,654,011 A | 8/1997 | Jackson et al. | 424/635 |
| 5,763,389 A | 6/1998 | Shen et al. | 514/2 |
| 5,792,503 A | 8/1998 | Gugger et al. | 426/634 |
| 5,985,338 A | * 11/1999 | Suh et al. | 426/69 |

FOREIGN PATENT DOCUMENTS

| | | |
|---|---|---|
| EP | 0 626 175 | 11/1994 |
| EP | 0 647 408 A1 | 4/1995 |
| EP | 0 827 698 A2 | 3/1998 |
| WO | WO 91 09538 | 7/1991 |
| WO | WO 97 31546 | 9/1997 |
| WO | WO 97 37547 | 10/1997 |

OTHER PUBLICATIONS

Kurzer and Xu, "Dietary Phytoestrogens," Annu. Rev. Nutr, 1997, 17, pp. 353–381.
GeniSoy™ Product Information, May 8, 1998.
GeniSoy™ Product Literature, May 8, 1998.
Ross Medical Nutritional System Product Handbook, 1996, pp. 2, 4, 28, 36, 66.
Ross Pediatric Nutritional Product Guide, 1997, pp. 36–37.
Ross Medical Nutritional Products, Optimental™, 1998, pp. 1–8.

* cited by examiner

Primary Examiner—Theodore J. Criares
Assistant Examiner—Jennifer Kim
(74) Attorney, Agent, or Firm—Nickki L. Parlet

(57) ABSTRACT

The present invention relates generally to a complete nutritional product that provides soy protein and enhanced levels of isoflavones. Preferably, the soy protein comprises at least 0.7 mg isoflavones/gm soy protein and at least 0.5 mg genistein/gm soy protein. The product is fortified at 35% of the RDI for calcium and contains an antioxidant package. The invention also describes the method to produce a heat stable isoflavone-enriched soy protein complete nutritional.

28 Claims, No Drawings

SOY-BASED NUTRITIONAL PRODUCTS

CROSS REFERENCE

This application is a continuation-in-part of U.S. patent application Ser. No. 09/107,886 which was filed on Jun. 30, 1998.

TECHNICAL FIELD

The present invention relates generally to a low fat, vitamin/mineral fortified soy-based oral nutritional product useful for providing soy protein in addition to the inherent isoflavones to a health conscious population.

BACKGROUND OF THE INVENTION

Substitution of vegetable protein for animal protein in an individual's diet has traditionally addressed the needs of persons with food allergies or intolerance to dairy-based formula components (usually casein, whey, or lactose) and individuals who desire to limit or avoid animal protein for life style philosophy (vegetarianism) or religious beliefs and practices. As positive outcomes from research in the area of vegetable extracts in the nutritional management of disease states are published, desire to add these "added value" vegetables to individual diets has expanded in the general population.

Many of the "active components" identified in vegetables are phytoestrogens. A number of these compounds have been identified in fruits, vegetables, and whole grains commonly consumed by humans. Phytoestrogens include isoflavones which occur in a variety of leguminous plants. Soybeans are the most significant dietary sources of isoflavones. Isoflavones have been detected and identified in biological fluids of humans consuming the plant material. Due to the phenolic structure, which is similar to those of animal estrogens, these compounds exhibit weak estrogenic properties and are termed phytoestrogens. It is the isoflavones which have received the most attention and have been reviewed in great detail in "Mammalian lignans and phyto-oestrogens- Recent studies on their formation, metabolism and biological role in health and disease" by Setchell and Adlercreutz, *Role of the Gut Flora in Toxicity and Cancer*. New York, Academic Press, 1988; pp 315–45; "Naturally Occurring Oestrogens in Foods- A Review" by Price and Fenwick, *Food Additives and Contaminants*, Vol.2, No.2, pp73–106,1985; and "Dietary Phytoestrogens" by Kurzer and Xu, *Annual Review of Nutrition* Vol 17, 1997; pp 353–81.

Studies in humans, animals and cell culture systems suggest that dietary phytoestrogens play an important role in prevention of menopausal symptoms, osteoporosis, cancer, and heart disease. Proposed mechanisms include estrogenic and antiestrogenic effects, induction of cancer cell differentiation, inhibition of tyrosine kinase and DNA topoisomerase activities, suppression of angiogenesis and anti-oxidant effects. The major isoflavones occurring in plants are the glycosides of genistein, daidzein and glycitein.

Isoflavones isolated from soy have become the focus of much research in the areas of heart disease, cancer, osteoporosis and kidney diseases. This expanding knowledge in the possible role of soy and its fractions in the nutritional management of disease states has presented practical challenges for the average consumer in the market place. The primary challenge is access to good tasting products with naturally high concentrations of isoflavones. The isoflavone contents in commercial soy raw ingredients vary depending on the levels of isoflavones in the plant variety and processing procedures. For example, approximately 90% of phytoestrogens present in soy foods are beta-glucoside conjugates of daidzein and genistein. However, in fermented soy products, the aglucones (unconjugated) are the predominant forms. The nutrient and isoflavone content of the most common available soy foods, soy ingredients and nutritionals are listed in Table 1 below.

TABLE 1

Nutrient and Isoflavone Content of Different Soy Foods and Ingredients*

| Soy food | Calories Kcal | Protein g (% of Cal.) | Fat g (% of Cal.) | Estimated Isoflavone mg |
|---|---|---|---|---|
| Miso (1 oz) | 35 | 2 (23) | 1 (25) | 10 |
| Soybeans, cooked (½ cup) | 149 | 14 (37) | 8 (48) | 35 |
| Soy flour (3½ cup) | 441 | 35 (32) | 22 (45) | 50 |
| Soymilk (1 cup) | 140 | 10 (28) | 4 (26) | 40 |
| Soymilk, low-fat (1 cup) | 120 | 8 (26) | 3 (22) | 40 |
| Soy nuts, dry roasted (½ cup) | 387 | 34 (35) | 19 (44) | 50 |
| Soy protein isolate (1 oz) | 94 | 25 (100) | 1 (9) | 15 |
| Tempen (4 oz) | 204 | 17 (33) | 8 (35) | 40 |
| Tofu, low-fat (3 oz) | 35 | 6 (68) | 1 (25) | 30 |
| Tofu, extra-firm (3 oz) | 60 | 6 (40) | 3 (45) | 45 |
| Textured Vegetable Protein (¼ cup, dry) | 59 | 11 (74%) | 0 (0) | 35 |
| Ensure (8 fl. oz.) | 250 | 8.8 (14) | 6.1 (22) | 2.6 |
| GeniSoy (35 gm) | 130 | 14 (43) | 0 (0) | 14–70** |

*Table adapted from US Department of Agriculture Handbook 8
**Based on GeniSoy literature which describes a typical isoflavone range from 1.0–5.0 mg isoflavone/gram soy protein, assuming 100% of the protein is soy protein containing isoflavone.

While there are a few soy-based foods available on the market today, they are not easily incorporated into an individual's diet. Accessibility of the products listed in Table 1 is an issue for most of the general population. A few of the products are starting to be stocked in standard grocery stores; however, many must be purchased in "Health Food Stores". More importantly, the taste and texture of soy products are objectionable to many individuals that have not grown up with soy protein in their diets. In addition, most of the foods in Table 1 are ingredients to be incorporated into a food dish and most individuals do not know how to cook with these ingredients. While the roasted soy nuts, which would probably be an acceptable snack food for most individuals, weigh in with a high isoflavone content, the high calorie and fat content are unacceptable for daily incorporation into an individual's diet. Soy milk is a reasonable source of isoflavones and has been used by individuals with cow milk allergies for many years and there are currently more flavors and fat content options to chose from. A serving (1 cup) of "Light" soy milk contains 3 grams of fat and 8 grams of protein in 120 total calories. No inherent vitamins and a small amount of calcium and iron (2% of the RDI) are present in soy milk. A serving (1 cup) of full fat soy milk contains 4 grams of fat and 10 grams of protein in 140 total calories. The requirement for refrigerated storage and the flavor of soy milk remain a major obstacle for the average consumer.

FDA-regulated food products began using the Daily Value as the basis for declaring nutrient content May 8, 1994.

Daily Values (DVs) are a set of dietary reference values to help consumers use food label information to plan a healthy overall diet. DVs actually comprise two sets of reference values for nutrients: Daily Reference Values (DRVs) and Reference Daily Intakes (RDI).

DRVs are a set of dietary references for which no set of standards previously existed. DRVs apply to fat, saturated fat, cholesterol, carbohydrate, protein, fiber, sodium and potassium. Based on 2,000 calories a day for adults and children over 4, the DRV for fat is 65 grams; saturated fat is 20 gm; cholesterol is 300 milligrams; total carbohydrate is 300 grams; fiber is 25 grams; sodium is 2,400 milligrams; potassium is 3,500 milligrams; and protein is 50 grams.

RDIs are a set of dietary references based on the Recommended Dietary Allowances (RDA) for essential vitamins and minerals. The name "RDI" replaces the term "U.S. RDA"(Recommended Daily Allowances). Recommended Dietary Allowances (RDA) are the set of estimated nutrient allowances established by the National Academy of Sciences used as the basis for setting the U.S.RDAs. It is updated periodically to reflect current scientific knowledge.

The liquid nutritional, Ensure® (Ross Products Division of Abbott Laboratories, Chicago, Ill.), a good tasting, shelf stable, ready to drink complete nutritional with a protein system that contains soy protein isolate, is an alternative to the more traditional soy foods. However, only 20% of the total protein system is soy protein isolate resulting in an isoflavone content too low to practically provide the benefit of consuming soy protein.

GeniSoy™ is a powdered protein shake manufactured by GeniSoy Products Co. (Fairfield, Calif.) with water processed isolated soy protein. A serving (8 oz.) of the Vanilla product contains 14 gm of soy protein, zero fat and 18 gm of total carbohydrate in 130 calories. The vitamins and minerals are fortified at 25% of the RDI with the exception of vitamin E (170% of the RDI). GeniSoy Products literature states that although the isoflavone content of GeniSoy is not tested, typical isoflavone values for water processed soy protein isolate range from 1.0 to 5.0 mg of isoflavone/gram soy protein isolate. While this vitamin and mineral fortified product provides large amounts of soy protein isolate in a single serving, it is not a complete nutritional that could be used as a sole source of nutrition due to the absence of fat in the form of essential fatty acids. Further, the inconvenience of the powder form and the soy flavor remain an issue for many consumers.

Isoflavone compounds are associated with the inherent bitter flavor of soybeans. Consequently, in the production of commercial products, such as isolates and concentrates, the focus has been traditionally to remove these materials. For example, in a conventional process for the production of a soy protein isolate, in which soy flakes are extracted with an aqueous alkaline medium, much of the isoflavones are solubilized in the extract, and remain solubilized in the whey, which is usually discarded following acid precipitation of the protein to form an isolate. Residual isoflavones left in the acid precipitated protein isolate are usually removed by exhaustive washing of the isolate. This process has been modified to maintain and enrich the isoflavone content of the vegetable isolates, concentrates, protein fiber and whey.

EP 0 647 408 by Shen, et al., teaches how to manufacture an isoflavone enriched vegetable protein isolate by extracting a vegetable protein material containing isoflavones at a pH above the isoelectric point of the material, then adjusting the pH to about the isoelectric point of the protein material resulting in a precipitate, then doing limited washing of the precipitate to provide an isoflavone enriched protein isolate.

U.S. Pat. No. 5,637,562 by J. L. Shen discloses a process to manufacture isoflavone enriched vegetable protein concentrate through an isoelectric wash of a vegetable protein material to provide a protein concentrate, which is slurried and reacted with a sufficient amount of beta-glucosidase enzyme or esterase enzyme for a time period, temperature and pH sufficient to convert at least a majority of the glucone isoflavones contained in the concentrate to aglucone isoflavones.

U.S. Pat. No. 5,352,384 by J. L. Shen discloses a process to manufacture isoflavone enriched vegetable protein fiber. The starting material is extracted at a pH above the isoelectric point of the protein material, the aqueous slurry containing the solubilized isoflavones is reacted with a beta-glucosidase to convert the isoflavones in glucone form to an aglucone isoflavone making the isoflavones less soluble, the fibrous residue is recovered to provide a vegetable fiber product which has been enriched with aglucone isoflavones.

U.S. Pat. No. 5,637,561 by J. L. Shen discloses a process to make aglucone isoflavone enriched vegetable protein whey by treating the whey stream, comprising glucone isoflavones, with a sufficient amount of beta-glucosidase enzyme or esterase enzyme or acid to convert at least a majority of the glucone isoflavones to aglucones thereby providing an aglucone enriched whey stream. The aglucone enriched whey protein is obtained by recovery of the protein.

The importance of isoflavone enriched vegetable protein sources becomes more apparent when one reviews the field of isoflavone research. Most of the human research on isoflavones has been carried out by incorporating soy products into the typical American diet or studying Asian countries where soy is a normal part of the diet. While the health benefits of soy have been attributed to isoflavones, the actual active ingredient or ingredients have yet to be identified. The level and ratio of the isoflavones in addition to other inherent components of soy may play an important role in the health benefits attributed to soy. However, there are dietary supplement patents incorporating isolated phytoestrogens into compositions for the management of osteoporosis and premenstrual syndrome.

A product containing isoflavones for the management of osteoporosis is described in U.S. Pat. No. 5,424,331 by M. Shlyankevich which discloses a pharmaceutical or dietary supplement for the treatment or prevention of osteoporosis. The composition comprises phytoestrogen compounds; dried licorice root extract; calcium, magnesium and zinc salts; beta carotene; and vitamin D and E in an acceptable inert carrier.

A product containing isoflavones for the management of premenstrual syndrome is described in U.S. Pat. No. 5,569,459 by M. Shlyankevich which discloses a pharmaceutical or dietary supplement for controlling the stimulation of estrogen production. The composition comprises phytoestrogen compounds; dried licorice root extract; a sedative selected from the group consisting of Balerian root dry extract, passion flower dry extract and Ginseng root powder; beta-carotene; pyridoxine hydrochloride; Vitamin E; calcium, magnesium and zinc salts; coumestan; and pantothenic acid in an acceptable inert carrier.

A dietary supplement for supplementing the nutritional needs of women and preventing or reducing life stage associated health risks during each of their principal adult life stages (pre-perimenopause, perimenopause and menopause, or post-menopause) is described in U.S. Pat.

No. 5,654,011 by S. D. Jackson, et al. The dietary supplement comprises calcium, magnesium, boron, copper, manganese, zinc, vitamin D, E and C; iron, folic acid, vitamin $B_{12}$ and $B_6$; chromium, and phytoestrogens in a biologically acceptable carrier.

As discussed above, there are several soy-based products currently available to the consumer. However, they are products with unacceptable taste or mouth feel, they require special storage conditions such as refrigeration or are in powder forms requiring an additional reconstitution step before consumption. Further limitations of these products appear in their nutrient content. Their nutrient content ranges from no supplementation of vitamins and minerals to fortification at 25% of the RDI. These soy based products have not been optimized to complement the positive effects attributed to soy such as, for example, fortification of the formula to provide a calcium/phosphorous ratio sufficient to complement the effects of soy on osteoporosis; or a sodium limitation for the hypertensive individual; or an antioxidant package to complement the cancer and heart disease benefits of soy.

Clearly, there is need for a convenient, shelf stable, low fat, calcium enriched, good tasting, complete nutritional which is a soy-based product that will deliver inherent isoflavones to an individual choosing to supplement their diet with soy protein.

SUMMARY OF THE INVENTION

The present invention relates generally to a shelf stable, low fat, vitamin and mineral fortified soy-based complete liquid nutritional product useful for providing soy protein and its inherent isoflavones to an individual.

One aspect of the invention is a complete liquid nutritional product containing a protein system providing from about 17% to about 25% of the total calories of the product, preferably from about 19% to about 23% of the total calories of the product; a lipid system which provides from about 5% to about 15% of the total calories of the product, preferably from about 10% to about 14% of the total calories of the product; a carbohydrate system which provides from about 56% to about 68% of the total calories of the product, preferably from about 57% to about 65% of the total calories of the product; and a vitamin and mineral system in quantities sufficient to make the product a complete nutritional, preferably at least 20% of the RDI in a single serving. The liquid nutritional product has a caloric density from about 0.6 kcal/ml to about 1.1 kcal/ml, preferably from about 0.8 kcal/ml to about 1.0 kcal/ml.

The protein system contains from about 30% to 100% (% wt.) soy protein, preferably from about 50% to 100% soy protein. The soy protein is selected from the group including soy flakes, soy protein isolate, soy protein concentrate, hydrolyzed soy protein, soy flour, soy protein fiber, soy whey and mixtures thereof. Preferably, the soy protein comprises at least 0.7 mg isoflavones/gm soy protein and at least 0.5 mg genistein 1 gm soy protein, more preferably at least 1.2 mg isoflavones/gm soy protein and at least 0.8 mg genistein 1 gm soy protein.

The lipid system may be selected from the group including high oleic safflower oil, soy oil, fractionated coconut oil, high oleic sunflower oil, corn oil, canola oil and mixtures thereof. Preferably, the lipid system is a blend of 20% corn oil, 40% high oleic safflower oil and 40% canola oil.

The carbohydrate system may be selected from the group including hydrolyzed corn starch, maltodextrin, glucose polymers, sucrose, corn syrup solids, glucose, fructose, lactose, high fructose corn syrup, fructooligosaccharides and mixtures thereof. Preferably, the carbohydrate system comprises from about 35% to 52% of total carbohydrate as corn syrup, from 0 to about 22% of total carbohydrate as maltodextrin and from about 43% to 48% of total carbohydrate as sucrose, more preferably, from about 35% to about 40% of total carbohydrate as corn syrup, from 15% to about 22% of total carbohydrate as maltodextrin and from about 43% to 45% of total carbohydrate as sucrose.

The vitamin and mineral system for this complete nutritional comprises the vitamins A, $B_1$, $B_2$, $B_6$, $B_{12}$, C, D, E, K, beta-carotene, Biotin, Folic Acid, Pantothenic Acid, Niacin, Choline; the minerals calcium, magnesium, potassium, sodium, phosphorous, chloride; the trace minerals iron, zinc, manganese, copper, iodine; and the ultratrace minerals chromium, molybdenum and selenium. Preferably the calcium is fortified at 35% of the RDI in a single serving.

A second aspect of the invention is a method for providing soy protein containing inherent isoflavones, specifically genistein, to an individual by feeding the liquid nutritional product described above.

During the process of formulating the soy-based nutritional of the invention, unexpected stability challenges were addressed. A third aspect of the invention is the method of stabilizing a calcium enriched soy-based nutritional. The calcium enriched soy-based product comprises an isoflavone enriched soy protein, calcium fortified at 35% of the RDI with no more than 100 ppm soluble calcium and a stabilizer system to help suspend the insoluble minerals. Insoluble calcium sources are preferred to prevent the destabilization during sterilization of the soy protein by the soluble divalent minerals. Preferably the insoluble calcium sources are selected from soy-protein-bound-calcium and calcium citrate. More preferably, the soy-protein-bound-calcium contributes 85% of the total calcium and calcium citrate contributes 14% of total calcium. The stabilizer system consisting of cellulose gel and carrageenan provides for suspension of minerals; improved product physical stability; and improved organoleptic characteristics. Preferably, the stabilizer system comprises from about 1500 to about 2500 ppm cellulose gel and from about 150 to about 300 ppm carrageenan.

The stabilizing method further comprises the selection of a carbohydrate system consisting of maltodextrin, corn syrup and sucrose which expands the final product pH range of stability (6.6 to 7.2) while optimizing final product mouth feel. This carbohydrate system provides for a more durable formulation that can adapt to the variability seen in the stability of isoflavone enriched soy protein sources. The preferred carbohydrate system comprises from about 35% to about 52% of total carbohydrate as corn syrup, from 0 to about 22% of total carbohydrate as maltodextrin and from about 43% to about 48% of total carbohydrate as sucrose. Other aspects of the invention are described throughout the application.

The nutritional products of this invention may also be manufactured with organic/natural ingredients. A natural or organic product complements the health benefits of the soy protein/isoflavones. Attention to the way the source material is grown, processed and handled identifies the ingredients allowed in a natural or organic product.

DETAILED DESCRIPTION OF THE INVENTION

Any reference in this patent application to the "RDI for vitamins and minerals" refers to the list published in the 1993 Federal Register, Vol. 58. RDIs are a set of dietary references based on the Recommended Dietary Allowances (RDA) for essential vitamins and minerals. The name "RDI" replaces the term "U.S. RDA"(Recommended Daily Allowances). Recommended Dietary Allowances (RDA) are the set of estimated nutrient allowances established by the national Academy of Sciences used as the basis for setting the U.S.RDAs. It is updated periodically to reflect current scientific knowledge.

The term "total calories" refers to the total caloric content of a predetermined volume of the finished nutritional product. For example, a product with 12.5 gm of protein, 3 gm of fat and 33 gm of carbohydrate has 209 total calories per 237 ml.

The term "isoflavones" refers to the compounds having the following general formula, with specific compounds identified in Table 2.

TABLE 2

Chemical structures of isoflavones found in soybeans.

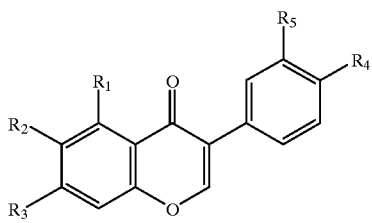

| Isoflavone | $R_1$ | $R_2$ | $R_3$ | $R_4$ | $R_5$ |
|---|---|---|---|---|---|
| Daidzein | H | H | OH | OH | H |
| Genistein | OH | H | OH | OH | H |
| Glycitein | H | $OCH_3$ | OH | OH | H |
| Daidzin | H | H | O-glucoside | OH | H |
| Genistin | OH | H | O-glucoside | OH | H |
| Glycitin | H | $OCH_3$ | O-glucoside | OH | H |

As described in Table 2, daidzin, genistin and glycitin are the beta-glucoside conjugate (glucones) moieties. Daidzein, genistein and glycitein are the unconjugated (aglucones) moieties. As used herein "daidzein, genistein and glycitein levels" include both the conjugated and unconjugated moieties. The typical ratio of genistein to daidzein to glycitein in soy protein is 67 to 30 to 3.

The term "soy protein or soy protein source" refers to any protein form isolated from soybeans including, for example, soy flakes, soy protein isolate, soy protein concentrate, hydrolyzed soy protein, soy flour and soy protein fiber.

The term "standard genistein" soy protein refers to soy proteins that contain from about 0.5 to about 1.0 mg genistein per gram of soy protein.

The term "high genistein soy protein" and "isoflavone enriched soy protein" refers to soy proteins that contain at least 1.0 mg genistein per gram of soy protein.

The term "total isoflavone content" refers to the total amount of genistein, daidzein, glycitein and their glucoside moieties.

The term "complete nutrition" refers to a product that may be used as the sole source of nutrition. A complete nutritional provides 8 to 14 gm of protein; 3 to 10 gm fat; 30 to 40 gm carbohydrate; and 20 to 40% of the RDI for vitamins and minerals in 8 fl. oz or about 240 ml.

The term "single serving" refers to approximately 8 fl. oz or about 240 ml.

The term "genetically engineered " or "genetically modified organisms" (GMO) refers to ingredients made by techniques that alter the molecular or cell biology of an organism by means that are not possible under natural conditions or processes. Genetic engineering includes recombinant DNA, cell fusion, micro- and macro-encapsulation, gene deletion and doubling, introducing a foreign gene, and changing the positions of genes. It shall not include breeding, conjugation, fermentation, hybridization, in-vitro fertilization and tissue culture.

It is a principal object of the invention to provide an improved soy-based food for individuals who wish to add soy to their diets. The invention is to provide a shelf stable, low fat, good tasting liquid food composition which utilizes a soy protein system containing inherent levels of isoflavones, provides antioxidants and is a good source of calcium. Another object of this invention is to provide a method for stabilizing a calcium enriched soy-based nutritional.

The nutritional formulas of this invention will typically provide the following caloric distribution. The protein system will typically provide from about 17% to about 25% of total calories, more preferably from about 18% to about 24% of total calories. The fat system will provide from about 5% to about 15% of total calories, more preferably about 10% to about 14% of total calories. The carbohydrate system will typically provide from about 56% to about 68% of total calories, more preferably from about 57% to about 65% of total calories. The caloric density is typically from about 0.60 kcal/ml to about 1.10 kcal/ml, preferably from about 0.80 kcal/ml to about 1.0 kcal/ml.

One component of the nutritional formula of this invention is soy protein. As described above, a number of soy protein sources may be considered. The soy protein is isolated from the soybean. The soybean is an excellent source of high quality protein where about 38% to 40% of the soybean is protein. Briefly (as shown in Scheme I), the processing of soybeans involves the extraction of the oil from the dehulled, and cracked soybeans leaving the defatted soybean flakes.

Scheme I
Soybean Processing

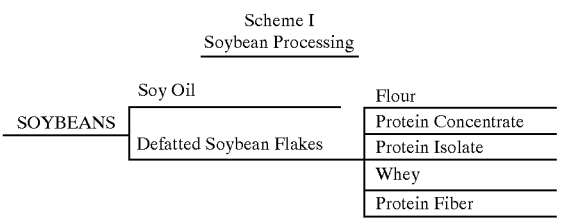

The defatted soybean flakes are typically milled into flours; alcohol-extracted or alkoline/$H_2O$ extracted to remove flavor compounds and sugars to make protein concentrates; and processed with water to remove sugars and flavor compounds, precipitated and dried to make protein isolates. Whey and protein fiber are by-products of the above processes. The preferred soy protein is processed in a manner to enrich the isoflavone content so that total isoflavone content (glucone and aglucone forms of genistein+ daidzein+glycitein) is at least 0.7 mg isoflavones/gram soy protein. Further, the genistein content of the soy protein is at least 0.5 mg genistein/gram soy protein. Acceptable soy protein sources are listed in the attached Examples. Preferred methods to produce isoflavone enriched vegetable protein were discussed briefly in the Background when reviewing production methods of isoflavone enriched soy protein described in EP 0 647 408, U.S. Pat. No. 5,637,562, U.S. Pat. No. 5,352,384, and U.S. Pat. No. 5,637,561 all by J. L. Shen.

The method used to analyze isoflavones in the final product utilizes the published extraction procedure of Murphy et al., Isoflavones in Soy-Based Infant Formulas, *Journal of Agricultural and Food Chemistry*, Vol 45, 1997, pp. 4635–4638. The non-polar nature and the intense UV absorptivities of these compounds make reversed phase HPLC a suitable approach for their determination in a variety of foods. An acidic 50/50 acetonitrile/water solution is used to extract the isoflavones from lyophilized product. The filtered extract is diluted with a buffered beta-glucuronidase solution, which rapidly affects the conversion of all conjugated forms (the "glucones") of each isoflavone to the unconjugated form (the "aglucones" daidzein, genistein and glycitein). The aglucones are then separated by reversed phase chromatography, and detected by UV absorbance at 250 nm (daidzein) and at 262 nm (genistein). The aglucone concentrations are then determined by peak area proportionation versus solutions of specialized chemical reference standards of known concentrations. Glycitein values are estimated from the genistein standard response at 262 nm as there is no glycitein standard available.

Soy proteins enriched with isoflavones have proven to be less heat stable than the regularly processed soy protein. The presence of soluble divalent minerals in the final product destabilizes the protein upon terminal sterilization. Consequently, the preferred soy protein source contains calcium in a colloidal suspension with the protein. U.S. Pat. No. 4,642,238 by H. C. Santz, et al., teaches how to produce a mineral enriched protein by combining a hydrated gel of an alkaline earth salt with soy protein isolate to form a mineral enriched soy protein composition. Preferably, about 85% of the total calcium is contributed by calcium bound to the soy protein and about 14% of total calcium is supplied by calcium citrate (insoluble calcium). Soluble calcium levels are no more than about 0.1% (100 ppm), preferably no more than 0.01% (10 ppm). Soluble calcium levels over 100 ppm destabilize the soy proteins during terminal sterilization.

A natural or organic version of the nutritional products of this invention incorporates soy protein isolated from non-GMO soy beans.

The second component of the nutritional products of this invention is the fat system. As stated above, from about 5% to about 15% of the total calories of the nutritional products of the present invention are provided by this fat system. Any of the typical fat sources could be used such as high oleic safflower oil, soy oil, fractionated coconut oil, high oleic sunflower oil, corn oil, canola oil and mixtures thereof. The preferred fat system is a blend of 40% high oleic safflower, 40% canola oil and 20% corn oil. This fat blend, at these levels, permits the product to meet the recommendations of the American Heart Association for less than 30% of total dietary calories from fat, less than 10% of total calories from saturated fat, and no more than 10% of total calories from polyunsaturated fat. This blend also meets the recommendation of a ratio of n-6 to n-3 fatty acids of between 4:1 and 10:1. The lipid system will also typically contain a blend of oils designed to provide all of the essential fatty acids required to prevent malnutrition. The essential fatty acid, linoleic acid, can be provided by incorporating canola oil and soy bean oil into the formula. Other sources of these essential fatty acids are well known in the art and include borage, black currant seed, corn, marine oils, fungal oils, safflower, high oleic safflower, sunflower, high oleic sunflower, evening primrose, cottonseed, rice bran, grapeseed, flaxseed, garlic, peanuts, almonds, walnuts, wheat germ, egg, and sesame. To avoid essential fatty acid deficiency issues with sole source nutrition applications, the levels of linoleic acid (1 8:2n6) were chosen to deliver about 1 to about 3% of total energy based on a volume of nutritional product of about 1500 ml.

A natural or organic version of the nutritional product of this invention will incorporate the fat sources listed above, where said fat sources have been extracted according to non-chemical means, for example mechanically pressed (expeller pressed), hydraulic pressed, or stone pressed. Mechanical pressing, also known as expeller pressing, removes oil through the use of continuously driven screws that crush the seed or other oil-bearing material into pulp from which the oil is expressed. In addition to a preferred extraction method for the fats of a natural or organic nutritional product, the starting material are non-GMO sources.

The third component of the nutritional products of this invention is a source of carbohydrates. The carbohydrates that may be used in the nutritional formula can vary widely. Examples of suitable carbohydrates that may be utilized include hydrolyzed corn starch, maltodextrin, glucose polymers, sucrose, corn syrup solids, glucose, fructose, lactose, high fructose corn syrup and fructooligosaccharides.

As noted above, the carbohydrates provide from about 56% to about 68% of the total calories of formula. Any single carbohydrate listed above, or any combination thereof, as appropriate may be utilized to provide these calories. The preferred carbohydrate system has been designed to optimize protein stability, mouth feel, and balance the palatability of the nutritional formula with the total calories contributed by simple sugars. The preferred carbohydrate source is a 35% of total carbohydrate corn syrup/22% of total carbohydrate maltodextrin mixture with 43% of total carbohydrate as sucrose.

Maltodextrins and corn syrup solids are complex carbohydrates routinely used in nutritional formulations because of their excellent digestibility and functional properties. Specifically, they are good water binders and provide products with desired texture and mouth feel. Maltodextrins are polysaccharides obtained from the acid or enzyme hydrolysis of corn starch. Their classification is based on the degree of hydrolysis and is reported as dextrose equivalents (DE). The FDA defines maltodextrins as non-sweet, nutritive polysaccharides that have a DE less than 20. Corn syrup solids are defined as having DE's greater than 20. Corn syrup solids consist of dextrose chains about 3 to 4 units long while the maltodextrin used in the present invention (Lodex 15) is less hydrolyzed and contains polymers of 5 to 6 dextrose units. Polymer length is a major difference between corn syrup (DE 29) and Lodex 15 (DE 18). The difference in polymer length results in different functionality.

In the present invention, the use of corn syrup as a partial substitute for the maltodextrin results in a product that remains stable over a broader pH range. Specifically, product with corn syrup from about 35% to about 52% of the total carbohydrates was very stable from a pH range from about 6.6 to about 7.2. The broader pH range provides for a more durable formulation that can easily accommodate stability variability in the isoflavone enriched soy protein.

Substitution of corn syrup for maltodextrin to maximize product stability negatively impacts product mouth feel. Maltodextrins are often used as fat replacers because of their ability to provide texture and mouth feel. These sensory attributes are diminished when the maltodextrin is completely replaced by corn syrup but to a much less extent when only partially substituted as in the preferred carbohydrate blend.

A natural or organic version of the nutritional products of this invention incorporates carbohydrates isolated from non-GMO sources. Natural Sugars distributed by Florida Crystals (Palm Beach, Fla.) is a minimally-processed natural sugar source. The juice is pressed from freshly-cut sugarcane, washed, filtered and crystallized. The product contains no artificial additives or preservatives.

The fourth component of the nutritional products of the present invention includes supplemented vitamins and minerals. The vitamin and mineral profile provides 20% to 30% of the RDI for vitamins and minerals in a single serving. Preferably, the nutritional products are designed so that two eight fluid ounce servings, approximately 480 ml, will provide at least 50% of the recommended daily intake (RDI) of vitamins and minerals.

The vitamin and mineral system for the complete nutritional of the invention comprises the vitamins A, $B_1$, $B_2$, $B_6$, $B_{12}$, C, D, E, K, beta-carotene, Biotin, Folic Acid, Pantothenic Acid, Niacin, and Choline; the minerals calcium, magnesium, potassium, sodium, phosphorous, and chloride; the trace minerals iron, zinc, manganese, copper, and iodine; and the ultratrace minerals chromium, molybdenum, selenium. Desirably, the nutritional products will include antioxidants such as a combination of beta-carotene, vitamin E and C at about 50% of the RDI per single serving.

Further the preferred nutritional product provides about a 1:1 ratio of calcium (35% of the RDI) to phosphorus (30% of the RDI) per single serving. Such high levels of calcium and phosphorus are achieved without compromising physical stability (destabilization of protein) by using a soy protein in which the calcium is bound to the protein (insoluble calcium) in combination with other sources of insoluble calcium. The preferred soy protein source contains calcium in a colloidal suspension with the protein. U.S. Pat. No. 4,642,238 by H. C. Santz, et al., teaches how to produce a mineral enriched protein by combining a hydrated gel of an alkaline earth salt with soy protein isolate to form a mineral enriched soy protein composition. Preferably, about 85% of the total calcium is contributed by calcium bound to soy protein and about 14% of total calcium is supplied by calcium citrate (insoluble calcium). Soluble calcium levels of more than about 0.1% (100 ppm or more) destabilizes the proteins during terminal sterilization.

The use of synthetic vitamins, minerals and/or accessory nutrients in products labeled as organic are limited to that which is required by regulation or recommended for enrichment and fortification by independent professional associations. "Accessory nutrients" refer to nutrients not specifically classified as a vitamin or mineral but found to promote optimal health. Examples include omega-3 fatty acids, inositiol, choline, isoflavones and taurine.

Suspension of insoluble minerals, product stability and mouth feel is further improved by using one or more stabilizers. Useful stabilizers include, but are not limited to, cellulose gel and carrageenans. The stabilizer system comprises from about 1,000 to about 5,000 ppm cellulose gel, more preferably from about 1,500 to about 2,500 ppm cellulose gel and from about 100 to about 600 ppm carrageenan, more preferably from about 150 to about 300 ppm carrageenan. This combination of stabilizers will result in a viscosity ranging from about 10 to about 100 centipoise (cps), more preferably from about 20 to about 45 cps.

The nutritional products of the present invention will also desirably include a flavoring and or color to provide the nutritional products with an appealing appearance and an acceptable taste for oral consumption. The flavor systems cover or work with the beany/nutty/bitter notes apparent in soy protein. Useful flavorings include, for example, strawberry, butter pecan, chocolate, banana and vanilla.

Natural flavors are materials which are comprised of flavor compounds derived from natural bases (typically botanicals such as herbs, spices, fruits or compounds derived from fermentation), a non-synthetic carrier (ethanol, propylene glycol, etc.), and agents which help preserve the natural flavors (grain ethanol, non-synthetic glycerin, non-synthetic acetic acid) The natural constituents included in the natural flavor are extracted using a number of natural and synthetic solvents. The solvents are removed by evaporation with the final flavor compounds including trace amounts of the solvents (typically<10 ppm). The number of flavor compounds comprising natural flavors vary, but may number up to 100 or more. A natural or organic version of the nutritional products of this invention incorporates natural flavors.

The nutritional products of this invention can be manufactured using techniques well known to those skilled in the art. While manufacturing variations are certainly well known to those skilled in the nutritional formulation arts, a few of the manufacturing techniques are described in detail in the Examples. Generally speaking an oil blend is prepared containing all oils, any emulsifier, and the fat soluble vitamins. Two more slurries (carbohydrate and protein) are prepared separately by mixing the carbohydrate and minerals together and the protein in water. The two slurries are then mixed together with the oil blend. The resulting mixture is homogenized, heat processed, standardized with water soluble vitamins, flavored and the liquid terminally sterilized or dried to produce a powder. The formula can be sterilized and subsequently utilized on a ready-to-feed (RTF) basis or stored in a concentrated liquid or a powder form.

EXAMPLE I

Table 3 presents a bill of materials for manufacturing 454 kg (1,000 lbs.) of a vanilla flavored liquid nutritional product with soy protein containing standard or high genistein levels according to the present invention. A detailed description of its manufacture follows.

TABLE 3

Bill of Materials For Liquid Vanilla Flavored Product with Standard or High Genistein Soy Protein Isolate

| Ingredient Name | Standard Genistein | High Genistein |
|---|---|---|
| Water | 347 kg (765 lbs) | 340 kg (749 lbs) |
| Maltodextrin | 35.6 kg (78.5 lbs) | 15 kg (33.8 lbs) |
| Corn Syrup | NAP | 29 kg (64.9 lbs) |
| Sucrose | 32.2 kg (70.9 lbs) | 28 kg (62.2 lbs) |
| Soy Protein Isolate | 28 kg (61.7 lbs) | 27.5 kg (60.7 lbs) |
| High Oleic Safflower Oil | | 1.76 kg (3.87 lbs) |
| Canola Oil | | 1.76 kg (3.87 lbs) |
| Potassium Citrate | | 1.77 lbs (3.90 lbs) |
| Magnesium Phosphate | | 1.27 kg (2.80 lbs) |
| Vanilla Flavor | | 0.91 kg (2.00 lbs) |
| Cellulose Gel | | 0.91 kg (2.00 lbs) |
| Corn Oil | | 0.88 kg (1.94 lbs) |
| Calcium Citrate | | 0.45 kg (1.00 lbs) |
| Choline Chloride | | 240 gm (0.529 lbs) |
| Sodium Citrate | | 227 gm (0.500 lbs) |
| Soy Lecithin | | 197 gm (0.435 lbs) |
| UTM/TM Premix* | | 163 gm (0.359 lbs) |

TABLE 3-continued

Bill of Materials For Liquid Vanilla Flavored Product with Standard or High Genistein Soy Protein Isolate

| Ingredient Name | Standard Genistein | High Genistein |
|---|---|---|
| Ascorbic Acid | 148 gm (0.326 lbs) | |
| Carrageenan | 68 gm (0.150 lbs) | |
| Vitamin DEK premix** | 44 gm (0.0970 lbs) | |
| WSV Premix^ | 29 gm (0.0639 lbs) | |
| 30% Beta Carotene | 3.7 gm (0.00816 lbs) | |
| Vitamin A Palmitate Premix^^ | 1.6 gm (0.00364 lbs) | |
| Potassium Iodide | 233 mg (0.000515 lbs) | |

*The ultratrace mineral/trace mineral (UTM/TM) premix contributes 20.5 gm zinc sulfate (0.04504 lbs.), 26.6 gm ferrous sulfate (0.05858 lbs.), 7.6 gm manganese sulfate (0.01665.), 4.0 gm cupric sulfate (0.00864 lbs.), 250 mg chromium chloride (0.00055 lbs.), 200 mg sodium molybdate (0.00044 lbs), 91 mg sodium selenate (0.00020 lbs.) to the product.
**The vitamin D, E, K premix provides 6.3 mg vitamin $D_3$ (0.000014 lbs.), 29.5 gm vitamin E (alphatocopherol acetate)(0.065090 lbs.), and 49 mg vitamin K (phylloquinone)(0.000108 lbs) to the product.
^The water soluble vitamin (WSV) premix provides 16.5 gm nicotinamide (0.03640 lbs.), 10.7 gm d-calcium pantothenate (0.02354 lbs.), 368 mg folic acid (0.00081 lbs.), 2.7 gm thiamine chloride HCl (0.00601 lbs.), 2.1 gm riboflavin (0.00469 lbs.), 2.6 gm pyroxidine HCl (0.00578 lbs.), 7.3 mg cyanocobalamin (0.000016 lbs.) and 322 mg biotin (0.00071 lbs.) to the product.
^^Vitamin A palmitate premix provides 909 mg vitamin A palmitate (0.002002 lbs.) to the product.

The liquid nutritional products of the present invention are manufactured by preparing three slurries which are blended together, heat treated, standardized, packaged and sterilized. The process for manufacturing 1,000 lbs. of a liquid nutritional product, using the bill of materials from Table 3, is described in detail below.

A carbohydrate/mineral slurry is prepared by combining the specified amount of cellulose gel (Avicel CL-611 distributed by FMC Corp., Philadelphia, Pa.) with the required amount of water under high agitation. The mixture is heated to a temperature of from about 140° F. to about 150° F. with agitation. The cellulose gel must be dissolved before the mineral addition. The following minerals are then added in the order listed, under high agitation: potassium citrate, sodium citrate, and UTM/TM premix (U.S. Pat. No. 5,221,545 by M. W. Borschel, et al., teaches how to produce the premix used in this invention). The slurry is held under agitation for a minimum of 5 minutes. The remaining minerals are added, in the order listed under high agitation: potassium iodide, and magnesium phosphate. Next, the maltodextrin (Lodex 15 distributed by American Maize, Hammond, Ind.) is added to the slurry under high agitation, and is allowed to dissolve. The sugar (sucrose) is then added under high agitation and allowed to dissolve. The completed carbohydrate/mineral slurry is held under high agitation at a temperature from about 140° F. to about 150° F. for not longer than twelve hours until it is blended with the other slurries.

An oil blend is prepared by combining and heating the high oleic safflower oil, corn and canola oil to a temperature from about 130° F. to about 140° F. with agitation. An emulsifier (soy lecithin) is then added under agitation and allowed to dissolve. The Vitamin D,E,K premix (distributed by Vitamin, Inc., Chicago, Ill.), Vitamin A Palmitate, and 30% beta-carotene are then added to the slurry with agitation. A stabilizer (carrageenan Viscarin SD-389® distributed by FMC Corp., Philadelphia, Pa.) is added to the slurry with agitation and allowed to disperse. The completed oil slurry is held under moderate agitation at a temperature from about 130° F. to about 140° F. for a period of no longer than twelve hours until it is blended with the other slurries.

A 10 to 12% protein-in-water slurry is prepared by first adding the soy protein isolate (Soy protein FXP-E-0101 distributed by Protein Technologies International, St. Louis, Mo.) to the required amount of water under high agitation. The slurry is heated to a temperature from about 85° F. to about 95° F. with agitation and held for a minimum of 15 minutes. The slurry temperature is then increased to a temperature of about 115° F. to about 125° F. and held for a minimum of 5 minutes. The slurry temperature is then increased to a temperature of about 145° F. to about 155° F. Cocoa powder (8 lbs.) is dispersed in the protein slurry for a chocolate flavored product. The completed protein-in-water slurry is held under moderate agitation at a temperature from about 145° F. to about 155° F. for a period of no longer than two hours until it is blended with the other slurries.

The protein-in-water and oil slurries are blended together with agitation and the resultant blend is maintained at a temperature from about 140° F. to about 150° F. After waiting for at least five minutes, the carbohydrate/mineral slurry is added to the blend from the preceding step with agitation and the resultant blend is maintained at a temperature from about 140° F. to about 150° F. The total solids of the final blend is about 25%. The blend pH is brought up to about 6.8 to about 7.0 with 1N KOH.

After waiting for a period of not less than five minutes nor greater than two hours, the blend is subjected to deaeration, ultra-high-temperature treatment, and homogenization, as follows:

A. deaerate the blend at 10–15 in. Hg;
B. preheat the blend through a plate/coil heat exchanger to 155–165° F.;
C. emulsify the blend at 900–1100 psig;
D. pass the blend through a plate/coil heater and heat the mix to from about 250° F. to about 255° F.;
E. ultra high temperature heat the blend to a temperature of about 298° F. to about 302° F. with a hold time of about 5 seconds;
F. reduce the temperature of the blend to from about 250° F. to about 255° F. by passing it through a flash cooler;
G. reduce the temperature of the blend to from about 160° F. to about 170° F. by passing it through a plate/coil heat exchanger;
H. homogenize the blend at about 3900 to about 4100/ about 400 to about 600 psig;
I. pass the blend through a hold tube for at least 16 seconds at temperature from about 165° F. to about 175° F.;
K. cool the blend to a temperature from about 340° F. to about 45° F. by passing it through a heat exchanger; and
L. store the blend at a temperature from about 34° F. to about 45° F. with agitation.

After the above steps have been completed, appropriate analytical testing for quality control is conducted. Based on the analytical results of the quality control tests, an appropriate amount of water is added to the batch with agitation for dilution to about 22% total solids.

A vitamin solution and a flavor solution are prepared separately and added to the processed blend.

The vitamin solution is prepared by adding the following ingredients to the required amount of water, under agitation: Ascorbic Acid, Water Soluble Vitamin Premix (distributed by Fortitech, Inc., Schenectady, N.Y.) and Choline Chloride. The vitamin solution pH is adjusted to from about 6 to about 10 with 45% KOH. The vitamin slurry is then added to the blended slurry under agitation.

The flavor solution is prepared by adding the natural and artificial flavor to the appropriate amount of water with agitation. The flavor slurry is then added to the blended slurry under agitation.

The product pH is adjusted to achieve optimal product stability. The completed product is then placed in suitable containers and subjected to terminal sterilization.

The final product total isoflavone content was 1.24 mg isoflavones/gm protein, 15.5 mg of isoflavones per 8 fl. oz serving. The genistein content was 0.86 mg genistein/gm protein, 10.7 mg of genistein per 8 fl. oz serving.

EXAMPLE II

Many studies have shown that daily consumption of at least 25 grams of soy protein are needed to maximize health promotion and wellness benefits. Twenty-five grams of standard soy proteins contains about 0.5 to 0.9 mg genistein per gram of protein. The use of soy protein containing high genistein would supply more isoflavones per unit weight of protein and consequently require less servings per day of the nutritional formula to meet the target.

Table 3 presents a bill of materials for manufacturing 454 kgm (1,000 Lbs) of a vanilla flavored liquid nutritional product with soy protein isolate containing high amounts of genistein according to the present invention.

The process for manufacturing 454 kgm (1,000 lbs.) of a liquid nutritional product, using the bill of materials for the high genistein product from Table 3, is described below.

A carbohydrate/mineral slurry is prepared as in Example 1 with a corn syrup addition prior to the maltodextrin addition. The corn syrup is added to slurry under high agitation and is allowed to dissolve. The completed carbohydrate/mineral slurry is held with high agitation at a temperature from about 140° F. to about 150° F. for not longer than twelve hours until it is blended with the other slurries.

The oil slurry is prepared as in Example 1 and is held under moderate agitation at a temperature from about 130° F. to about 140° F. for a period of no longer than twelve hours until it is blended with the other slurries.

A 10% to 12% protein-in-water slurry is prepared as in Example I. The product is manufactured using soy protein isolate distributed by PTI, St. Louis, Mo., under the trade designation "Soy Protein Isolate FXP-H0118." The completed protein-in-water slurry is held under moderate agitation at a temperature from about 145° F. to about 155° F. for a period of no longer than two hours until it is blended with the other slurries.

The protein-in-water, oil and carbohydrate/mineral slurries are blended together and pH adjusted as in Example I.

After waiting for a period of not less than five minutes nor greater than two hours, the blend is subjected to deaeration, ultra-high-temperature treatment, and homogenization as described in Example I.

As described in Example I the water soluble vitamin and flavor solutions are added and final product pH adjusted to achieve optimal product stability. The completed product is then placed in suitable containers and subjected to terminal sterilization.

The final product total isoflavone content was 1.52 mg isoflavones/gm protein, 19 mg of isoflavones per 8 fl. oz serving. The genistein content was 0.99 mg genistein/gm protein, 12.4 mg of genistein per 8 fl. oz serving.

EXAMPLE III

In order to decrease costs and increase shelf life, a powder form of the liquid nutritional would be beneficial.

Table 4 presents a bill of materials for manufacturing 454 kg (1,000 Lbs) of a vanilla flavored spray dried powder nutritional product according to the present invention. A detailed description of its manufacture follows.

TABLE 4

Bill of Materials for Spray Dried Powder
Vanilla Flavored Product with Standard
Genistein Soy Protein Isolate

| Ingredient Name | Powder Product |
| --- | --- |
| Corn Syrup | 99.6 kg (219.4 lbs) |
| Sucrose | 122 kg (269.5 lbs) |
| Soy Protein Isolate | 117.6 kg (259.0 lbs) |
| Maltodextrin | 66.6 kg (146.7 lbs) |
| High Oleic Safflower Oil | 8.2 kg (18.1 lbs) |
| Canola Oil | 8.2 kg (18.1 lbs) |
| Potassium Citrate | 3.5 kg (7.7 lbs) |
| Magnesium Phosphate | 5.0 kg (11.2 lbs) |
| Vanilla Flavor | 4.6 kg (10.2 lbs) |
| Corn Oil | 4.1 kg (9.0 lbs) |
| Choline Chloride | 0.99 kg (2.2 lbs) |
| Sodium Citrate | 3.5 kg (7.7 lbs) |
| UTM/TM Premix* | 0.7 kg (1.5 lbs) |
| Ascorbic Acid | 0.65 kg (1.4 lbs) |
| mixed tocopherols | 22.7 gm (0.05 lbs) |
| Vitamin DEK premix** | 0.19 kg (0.4 lbs) |
| WSV Premix^ | 0.12 kg (0.27 lbs) |
| Vitamin A Palmitate^^ | 72.6 gm (0.02 lbs) |
| Potassium Iodide | 458.5 mg (0.001 lbs) |

*The ultratrace mineral/trace mineral (UTM/TM) premix provides 88 gm zinc sulfate (0.194077 lbs.), 114 gm encapsulated ferrous sulfate (0.251651 lbs.), 32 gm manganese sulfate (0.071775 lbs.), 17 gm cupric sulfate (0.037023 lbs.), 1 gm chromium chloride (0.002380 lbs.), 1 gm sodium molybdate (0.002380 lbs), 387 mcg sodium selenate (0.000854 lbs.) to the product.
**The vitamin D, E, K premix provides 27 mcg vitamin D (0.000061 lbs.), 127 gm vitamin E (0.279874 lbs.), and 212 mcg vitamin K (0.000468 lbs) to the product.
^The water soluable vitamin (WSV) premix provides 47 gm niacinamide (0.103155 lbs.), 30 gm d-calcium pantothenate (0.066724 lbs.), 1 gm folic acid (0.002311 lbs.), 8 gm thiamine chloride HCl (0.017030 lbs.), 6 gm riboflavin (0.013309 lbs.), 7 gm pyroxidine HCl (0.016392 lbs.), 20 mcg cyanocobalamin (0.000046 lbs.) and 911 mcg biotin (0.002008 lbs.) to the product.
^^Vitamin A palmitate premix provides 4 gm vitamin A palmitate (0.008608 lbs.) to the product.

The powder nutritional products of the present invention are manufactured by preparing three slurries which are blended together, heat treated, standardized, spray dried, (and dry blended as in Example IV) and packaged. The process for manufacturing 1,000 lbs. of a spray dried powder nutritional product, using the bill of materials from Table 4, is described in detail below.

A 45% to about 55% total solids carbohydrate/mineral slurry is prepared by heating the required amount of water to about 145° F. to about 150° F. The following minerals are added in the order listed, under high agitation: potassium citrate, sodium citrate, and UTM/TM premix (distributed by Fortitech, Inc., Schenectady, N.Y.). The slurry is held under agitation for a minimum of 5 minutes. The remaining minerals are added in the order listed under high agitation: potassium iodide, and magnesium phosphate. The corn syrup is added under high agitation and allowed to dissolve. Next, the maltodextrin (Maltrin 40 distributed by Grain Processing Corporation, Muscataine, Iowa) is added to slurry under high agitation, and is allowed to dissolve. The sugar (sucrose) is then added under high agitation and allowed to dissolve. The completed carbohydrate/mineral slurry is held with high agitation at a temperature from about 140° F. to about 150° F. for not longer than twelve hours until it is blended with the other slurries.

The oil slurry is prepared by combining and heating the high oleic safflower oil, corn and canola oil to a temperature from about 130° F. to about 140° F. with agitation. The Vitamin D,E,K premix (distributed by Vitamins, Inc., Chicago, Ill.), Vitamin A Palmitate and mixed tocopherols (Tenox GT distributed by Eastman Chemical Company, Kingsport, Tenn.) are then added to the slurry with agitation. The completed oil slurry is held under moderate agitation at a temperature from about 130° F. to about 140° F. for a period of no longer than twelve hours until it was blended with the other slurries.

A 18% to about 22% total solids protein-in-water slurry is prepared by first dispersing the soy protein isolate (Supro Plus 675 distributed by Protein Technologies International, St. Louis, Mo.) in the required amount of water under high agitation. The completed protein-in-water slurry is held under moderate agitation at a temperature from about 145° F. to about 155° F. for a period of no longer than two hours until it is blended with the other slurries.

The protein-in-water and oil slurries are blended together with agitation and the resultant blend is maintained at a temperature from about 140° F. to about 150° F. After waiting for at least five minutes, the carbohydrate/mineral slurry is added to the blend from the preceding step with agitation and the resultant blend is maintained at a temperature from about 140° F. to about 150° F. The total solids of the final blend is about 40% to about 44%. The blend pH is brought up to about 6.8 to about 7.0 with 1 N KOH.

After waiting for a period of not less than five minutes nor greater than two hours, the blend is subjected to deaeration, HTST treatment, and homogenization, as follows:

a. deaerate the blend at 10–15 in. Hg;

b. preheat the blend through a plate/coil heat exchanger to 155–165 F.;

c. emulsify the blend at 900–1100 psig;

d. heat the blend to a temperature from about 160F. to about 170F. by passing it through a plate/coil heat exchanger, pass the blend through a hold tube for at least 16 seconds at temperature from about 160F. to about 170F.;

e. homogenize the blend at about 3900 to about 4100/ about 400 to about 600 psig;

f. cool the blend to a temperature from about 34F. to about 45F. by passing it through a heat exchanger; and g. store the blend at a temperature from about 34F. to about 45F. with agitation.

After the above steps have been completed, appropriate analytical testing for quality control is conducted. A vitamin solution and a flavor solution are prepared separately and added to the processed blend.

The vitamin solution is prepared by adding the following ingredients to the required amount of water, under agitation: Ascorbic Acid, Water Soluble Vitamin Premix (distributed by Fortitech, Inc., Schenectady, N.Y.) and Choline Chloride. The vitamin solution pH is adjusted to from about 6 to about 10 with 45% KOH. The vitamin slurry is then added to the blended slurry under agitation.

The flavor solution is prepared by adding the natural and artificial flavor to a minimal amount of water with agitation. The flavor slurry is then added to the blended slurry under agitation.

The total solids of the final standardized product is 40%. The product is preheated to 165° F. and homogenized at about 2500/500 psig before spray drying. A pilot scale high pressure nozzle tower spray drier (distributed by NIRO Hudson Inc., Hudson, Wis.) is used to dry the product. Drying conditions are an inlet temperature of 380° F. with an outlet temperature of 218° F. and nozzle #24 is used. The resulting powder is packaged under nitrogen to maximize product stability and flavor.

The final product total isoflavone content was 1.2 mg isoflavones/gm protein, 15 gm isoflavones per 8 fl. oz serving. The genistein content was 0.8 mg genistein/gm protein, 10 mg isoflavones per 8 fl. oz serving.

EXAMPLE IV

A less expensive process of manufacturing a powder is to dry blend major carbohydrates, proteins and powder flavor components into a spray dried base. The powder nutritional products of the present invention are also manufactured in a two-step spray dry/dry blend process. The spray dried base contains 100% of the oil blend, minerals, water soluble vitamins and oil soluble vitamins, 7% of the protein and 7% of the carbohydrates. The spray dried base is made by blending three slurries together, heat treating, standardizing, and spray drying as in Example III. The spray dried base is dry blended with the remaining carbohydrate, protein, flavor and ultratrace mineral/trace mineral premix. The process for manufacturing 1,000 lbs. of a powder nutritional product, using the bill of materials from Table 5, is described below.

TABLE 5

Bill of Materials for Dry Blended Powder Vanilla Flavored Product with Standard Genistein Soy Protein Isolate

| Ingredient Name | Spray Dry Base |
|---|---|
| Soy Protein Isolate | 8.5 kg (18.7 lbs) |
| Maltodextrin | 20 kg (43.8 lbs) |
| High Oleic Safflower Oil | 8.2 kg (18.1 lbs) |
| Canola Oil | 8.2 kg (18.1 lbs) |
| Potassium Citrate | 3.5 kg (7.7 lbs) |
| Magnesium Phosphate | 5.0 kg (11.2 lbs) |
| Vanilla Flavor | 4.6 kg (10.2 lbs) |
| Corn Oil | 4.1 kg (9.0 lbs) |
| Choline Chloride | 0.99 kg (2.2 lbs) |
| Sodium Citrate | 3.5 kg (7.7 lbs) |
| Ascorbic Acid | 0.65 kg (1.4 lbs) |
| mixed tocopherols | 22.7 gm (0.05 lbs) |
| Vitamin DEK premix** | 0.19 kg (0.4 lbs) |
| WSV Premix^ | 0.12 kg (0.27 lbs) |
| Vitamin A Palmitate^^ | 72.6 gm (0.02 lbs) |
| Potassium Iodide | 458.5 mg (0.001 lbs) |
| | Dry Blend Ingredients |
| Spray Dried Base | All |
| Sucrose | 136 kg (300 lbs) |
| Soy Protein Isolate | 110 kg (242 lbs) |
| Maltodextrin | 137 kg (302 lbs) |
| UTM/TM Premix* | 0.7 kg (1.5 lbs) |

*The ultratrace mineral/trace mineral (UTM/TM) premix provides 88 gm zinc sulfate (0.194077 lbs.), 114 gm encapsulated ferrous sulfate (0.251651 lbs.), 32 gm manganese sulfate (0.071775 lbs.), 17 gm cupric sulfate (0.037023 lbs.), 1 gm chromium chloride (0.002380 lbs.), 1 gm sodium molybdate (0.002380 lbs), 387 mcg sodium selenate (0.000854 lbs.) to the product.
**The vitamin D, E, K premix provides 27 mcg vitamin D (0.000061 lbs.), 127 gm vitamin E (0.279874 lbs.), and 212 mcg vitamin K (0.000468 lbs) to the product.
^The water soluble vitamin (WSV) premix provides 47 gm niacinamide (0.103155 lbs.), 30 gm d-calcium pantothenate (0.066724 lbs.), 1 gm folic acid (0.002311 lbs.), 8 gm thiamine chloride HCl (0.017030 lbs.), 6 gm riboflavin (0.013309 lbs.), 7 gm pyroxidine HCl (0.016392 lbs.), 20 mcg cyanocobalamin (0.000046 lbs.) and 911 mcg biotin (0.002008 lbs.) to the product.
^^Vitamin A palmitate premix provides 4 gm vitamin A palmitate (0.008608 lbs.) to the product.

The carbohydrate slurry is prepared as described in Example III using the amount of maltodextrin (Maltrin 40 distributed by Grain Processing Corporation, Muscataine, Iowa) listed in Table 5. The slurry is held with high agitation at a temperature from about 140° F. to about 150° F. for not longer than twelve hours until it is blended with the other slurries.

The oil slurry is prepared as described in Example III and is held under moderate agitation at a temperature from about 130° F. to about 140° F. for a period of no longer than twelve hours until it is blended with the other slurries.

A protein-in-water slurry is prepared as described in Example III using the amount of soy protein isolate (Supro Plus 675 distributed by PTI, St. Louis, Mo.) listed in Table 5. The completed protein-in-water slurry is held under moderate agitation at a temperature from about 145° F. to about 155° F. for a period of no longer than two hours until it is blended with the other slurries.

The protein-in-water, oil and carbohydrate/mineral slurries are blended together and the pH adjusted as described in Example III.

After waiting for a period of not less than five minutes nor greater than two hours, the blend is subjected to deaeration, HTST treatment, and homogenization as described in Example III.

A vitamin solution is prepared separately and added to the processed blend as in Example III.

The above mixture is spray dried as in Example III. The resulting spray dried base is dry blended with the remaining ingredients listed on Table 5. This two step process of spray drying a base and dry blending in the remaining ingredients is well known to those skilled in the art. U.S. Pat. No. 5,587,399 by P. J. Acosta, et al., teaches a method of preparing a nutritional product in which a powder base containing fats, carbohydrates, vitamins, mineral and trace elements is dry blended with specific amino acids to yield several different therapeutic products. This patent is incorporated herein by reference.

EXAMPLE V

A natural or organic version of the nutritional product of the invention complements the positive health benefits of the soy/isoflavones. Selection of natural ingredients are based on the USDA AMS National Organic Standards Board recommendations.

Table 6 presents a bill of materials for manufacturing 454 kg (1,000 lbs.) of a vanilla flavored liquid nutritional product with ingredients which qualify as "natural ingredients". A detailed description of its manufacture follows.

TABLE 6

Bill of Materials For Liquid Vanilla Flavored Product with Natural Ingredients

| Ingredient Name | |
|---|---|
| Water | 344 kg (758 lbs) |
| Maltodextrin | 14.4 kg (31.65 lbs) |
| Corn Syrup | 28.3 kg (62.27 lbs) |
| Evaporated Sugarcane Juice | 26.4 kg (58.14 lbs) |
| Soy Protein Isolate | 28.7 kg (63.23 lbs) |
| Canola Oil (Expeller pressed) | 3.7 kg (8.2 lbs) |
| Potassium Citrate | 1.6 lbs (3.51 lbs) |
| Magnesium Phosphate | 1.2 kg (2.60 lbs) |
| Natural Vanilla Flavor | 0.91 kg (2.00 lbs) |
| Cellulose Gel | 0.91 kg (2.00 lbs) |
| Corn Oil (Expeller pressed) | 0.93 kg (2.05 lbs) |
| Choline Chloride | 176 gm (0.388 lbs) |

TABLE 6-continued

Bill of Materials For Liquid Vanilla Flavored Product with Natural Ingredients

| Ingredient Name | |
|---|---|
| Sodium Citrate | 206 gm (0.455 lbs) |
| Soy Lecithin | 209 gm (0.461 lbs) |
| UTM/TM Premix* | 163 gm (0.359 lbs) |
| Ascorbic Acid | 148 gm (0.326 lbs) |
| Carrageenan | 136 gm (0.300 lbs) |
| Vitamin DEK premix** | 44 gm (0.0970 lbs) |
| WSV Premix^ | 29 gm (0.0639 lbs) |
| Beta Carotene for color | 3.7 gm (0.00816 lbs) |
| Vitamin A Palmitate Premix^^ | 2.3 gm (0.005071 lbs) |
| Potassium Iodide | 107 mg (0.0002359 |

*The ultratrace mineral/trace mineral (UTM/TM) premix contributes 20.5 gm zinc sulfate (0.04504 lbs.), 26.6 gm ferrous sulfate (0.05858 lbs.), 7.6 gm manganese sulfate (0.01665.), 4.0 gm cupric sulfate (0.00864 lbs.), 250 mg chromium chloride (0.00055 lbs.), 200 mg sodium molybdate (0.00044 lbs), 91 mg sodium selenate (0.00020 lbs.) to the product.
**The vitamin D, E, K premix provides 6.3 mg vitamin $D_3$ (0.000014 lbs.), 29.5 gm vitamin E (alphatocopherol acetate)(0.065090 lbs.), and 49 mg vitamin K (phylloquinone)(0.000108 lbs) to the product.
^The water soluble vitamin (WSV) premix provides 16.5 gm nicotinamide (0.03640 lbs.), 10.7 gm d-calcium pantothenate (0.02354 lbs.), 368 mg folic acid (0.00081 lbs.), 2.7 gm thiamine chloride HCl (0.00601 lbs.), 2.1 gm riboflavin (0.00469 lbs.), 2.6 gm pyroxidine HCl (0.00578 lbs.), 7.3 mg cyanocobalamin (0.000016 lbs.) and 322 mg biotin (0.00071 lbs.) to the product.
^^Vitamin A palmitate premix provides 909 mg vitamin A palmitate (0.002002 lbs.) to the product.

A carbohydrate/mineral slurry is prepared. The required water is heated to a temperature of from about 140° F. to about 150° F. with agitation. The following minerals are then added in the order listed, under high agitation: potassium citrate, sodium citrate, and UTM/TM premix (U.S. Pat. No. 5,221,545 by M. W. Borschel, et al., teaches how to produce the premix used in this invention). The slurry is held under agitation for a minimum of 5 minutes. The remaining minerals are added, in the order listed under high agitation: potassium iodide, and magnesium phosphate. Next, the maltodextrin (Lodex 15 distributed by American Maize, Hammond, Ind.) is added to the slurry under high agitation, and is allowed to dissolve. The evaporated cane juice (Natural Sugars distributed by Florida Crystals, Palm Beach, Fla.) is then added under high agitation and allowed to dissolve. The completed carbohydrate/mineral slurry is held under high agitation at a temperature from about 140° F. to about 150° F. for not longer than twelve hours until it is blended with the other slurries.

An oil blend is prepared by combining and heating the corn and canola oil to a temperature from about 130° F. to about 140° F. with agitation. An emulsifier (soy lecithin) is then added under agitation and allowed to dissolve. The Vitamin D,E,K premix (distributed by Vitamin, Inc., Chicago, Ill.), Vitamin A Palmitate, and 30% beta-carotene are then added to the slurry with agitation. A stabilizer (carrageenan Viscarin SD-389® distributed by FMC Corp., Philadelphia, Pa.) is added to the slurry with agitation and allowed to disperse. The completed oil slurry is held under moderate agitation at a temperature from about 130° F. to about 140° F. for a period of no longer than twelve hours until it is blended with the other slurries.

A 10 to 12% protein-in-water slurry is prepared by first adding the soy protein isolate (Soy protein FXP-E-0101 distributed by Protein Technologies International, St. Louis, Mo.) to the required amount of water under high agitation. The slurry is heated to a temperature from about 85° F. to about 95° F. with agitation and held for a minimum of 15 minutes. The slurry temperature is then increased to a temperature of about 115° F. to about 125° F. and held for a minimum of 5 minutes. The slurry temperature is then increased to a temperature of about 145° F. to about 155° F. Cocoa powder (8 lbs.) is dispersed in the protein slurry for a chocolate flavored product. The completed protein-in-water slurry is held under moderate agitation at a temperature from about 145° F. to about 155° F. for a period of no longer than two hours until it is blended with the other slurries.

The protein-in-water and oil slurries are blended together with agitation and the resultant blend is maintained at a temperature from about 140° F. to about 150° F. After waiting for at least five minutes, the carbohydrate/mineral slurry is added to the blend from the preceding step with agitation and the resultant blend is maintained at a temperature from about 140° F. to about 150° F. The total solids of the final blend is about 25%. The blend pH is brought up to about 6.8 to about 7.0 with 1 N KOH.

After waiting for a period of not less than five minutes nor greater than two hours, the blend is subjected to deaeration, ultra-high-temperature treatment, and homogenization as described in Example I.

As described in Example I the water soluble vitamin and flavor solutions are added and final product pH adjusted to achieve optimal product stability. The completed product is then placed in suitable containers and subjected to terminal sterilization.

The embodiments of the present invention may, of course, be carried out in other ways than those set forth herein without departing from the spirit and scope of the invention. The present embodiments are, therefore, to be considered in all respects as illustrative.

We claim:

1. A soy protein based complete liquid nutritional product comprising:
   (a) a protein source supplying from about 17% to about 25% of the total calories of the product, wherein said protein source comprises soy protein, wherein the soy protein source comprises at least 0.7 mg isoflavones/gm soy protein;
   (b) a lipid source supplying from about 5% to about 15% of the total calories of the product,
   (c) a source of carbohydrate supplying from about 56% to about 68% of the total calories of the product; and
   (d) vitamin and mineral system in quantities sufficient to make said product a complete nutritional.

2. The liquid nutritional product according to claim 1 wherein the soy protein contributes from about 30% to about 100% of the protein system.

3. The liquid nutritional product according to claim 2 wherein the soy protein supplies from about 18% to about 24% of the total calories of the product.

4. The liquid nutritional product according to claim 1 wherein the protein source is selected from the group consisting of soy flakes, soy protein isolate, soy protein concentrate, hydrolyzed soy protein, soy flour, soy protein fiber, soy whey and mixtures thereof.

5. The liquid nutritional product according to claim 1 in which the soy protein source comprises at least 0.5 mg genistein/gm soy protein.

6. The liquid nutritional product according to claim 1 in which the lipid source is selected from the group consisting of high oleic safflower oil, soy oil, fractionated coconut oil, high oleic sunflower oil, corn oil, canola oil and mixtures thereof.

7. The liquid nutritional product according to claim 7 in which the lipid source comprises a blend of corn oil, high oleic safflower oil and canola oil.

8. The liquid nutritional product according to claim 1 wherein the lipid source supplies from about 10% to about 14% of the total calories of the product.

9. The liquid nutritional product according to claim 1 wherein the carbohydrate source supplies from about 57% to about 65% of the total calories of the product.

10. The liquid nutritional product according to claim 1 wherein the carbohydrate source is selected from the group consisting of hydrolyzed corn starch, maltodextrin, glucose polymers, sucrose, corn syrup solids, glucose, fructose, lactose, high fructose corn syrup, fructooligosaccharides and mixtures thereof.

11. The liquid nutritional product according to claim 10 in which the carbohydrate source comprises a blend of corn syrup, maltodextrin and sucrose.

12. The liquid nutritional product according to claim 1 wherein the vitamin and mineral system supplies at least 20% of the RDI in a single serving.

13. The liquid nutritional product of claim 1 wherein the vitamin and mineral system further comprises Vitamin A, beta-carotene, Vitamin $B_1$, Vitamin $B_2$, Vitamin $B_6$, Vitamin $B_{12}$, Vitamin C, Vitamin D, Vitamin E, Vitamin K, Biotin, Folic Acid, Pantothenic Acid, Niacin, Choline, calcium, potassium, sodium, phosphorous, magnesium, chloride, trace minerals, and ultra trace minerals.

14. The liquid nutritional product of claim 13 wherein the calcium level is fortified at about 35% of the RDI in a single serving.

15. The liquid nutritional product according to claim 1 wherein the caloric density is from about 0.60 kcal/ml to about 1.10 kcal/ml.

16. The liquid nutritional product according to claim 15 wherein the caloric density is from about 0.80 kcal/ml to about 1.0 kcal/ml.

17. A method for providing soy protein to an individual comprising enterally feeding a liquid nutritional product according to claim 1.

18. A method for providing isoflavones to an individual comprising enterally feeding said individual with a liquid nutritional product according to claim 4.

19. A method for providing genistein to an individual comprising enterally feeding said individual with a liquid nutritional product according to claim 5.

20. A liquid nutritional product which comprises:
   (a) a protein system providing from about 18% to about 24% of the total calories of the product, wherein soy protein provides about 30% to 100% of said protein system, wherein the soy protein comprises at least 0.7 mg isoflavones/gm soy protein;
   (b) a lipid system which provides about 10% to about 14% of the total calories of the product, in which said lipid system comprises a blend of corn oil, high oleic safflower oil and canola oil;
   (c) a carbohydrate system which provides from about 57% to about 65% of the total calories of the product, in which said carbohydrate system comprises a blend of corn syrup, maltodextrin and sucrose; and
   (d) a vitamin and mineral system supplying 25% of the RDI in a single serving wherein said product has a caloric density from about 0.8 kcal/ml to about 1.0 kcal/ml.

21. The liquid nutritional product according to claim 20 wherein the protein system is selected from the group consisting of soy flakes, soy protein isolate, soy protein concentrate, hydrolyzed soy protein, soy flour, soy protein fiber, soy whey and mixtures thereof.

22. The liquid nutritional product according to claim 20 in which the soy protein comprises at least 0.5 mg genistein/gm soy protein.

23. The liquid nutritional product of claim 20 where in the vitamin and mineral system further comprises Vitamin A, beta-carotene, Vitamin $B_1$, Vitamin $B_2$, Vitamin $B_6$, Vitamin $B_{12}$, Vitamin C, Vitamin D, Vitamin E, Vitamin K, Biotin, Folic Acid, Pantothenic Acid, Niacin, Choline, calcium, potassium, sodium, phosphorous, magnesium, chloride, trace minerals, and ultra trace minerals.

24. A method for providing soy protein to an individual comprising enterally feeding a liquid nutritional product according to claim 20.

25. A method for providing isoflavones to an individual comprising enterally feeding said individual with a liquid nutritional product according to claim 20.

26. A method for providing genistein to an individual comprising enterally feeding said individual with a liquid nutritional product according to claim 22.

27. A stable terminally sterilized soy-based liquid nutritional product comprising:
   (a) an isoflavone enriched soy protein source wherein the soy protein source comprises at least 0.7 mg isoflavones/gm soy protein; and
   (b) a carbohydrate system wherein said carbohydrate system is a mixture of corn syrup, maltodextrin and sucrose.

28. The stable terminally sterilized soy-based liquid nutritional product of claim 27 wherein said carbohydrate system comprises from about 35% to 52% of total carbohydrate as corn syrup, from 0 to about 22% of total carbohydrate as maltodextrin and from about 43% to 48% of total carbohydrate as sucrose.

* * * * *

UNITED STATES PATENT AND TRADEMARK OFFICE
CERTIFICATE OF CORRECTION

PATENT NO. : 6,372,782 B1
DATED : April 16, 2002
INVENTOR(S) : Patel et al.

It is certified that error appears in the above-identified patent and that said Letters Patent is hereby corrected as shown below:

Column 22,
Line 1, "The liquid nutritional product according to claim" replace "7" with -- 6 --
Line 43, "nutritional product according to claim" replace "4" with -- 1 --

Signed and Sealed this

Fifth Day of November, 2002

*Attest:*

*Attesting Officer*

JAMES E. ROGAN
*Director of the United States Patent and Trademark Office*